United States Patent [19]

Massmann

[11] 4,346,408

[45] Aug. 24, 1982

[54] METHOD FOR THE TELEVISION SCANNING OF FILMS

[75] Inventor: Volker Massmann, Mühltal, Fed. Rep. of Germany

[73] Assignee: Robert Bosch GmbH, Stuttgart, Fed. Rep. of Germany

[21] Appl. No.: 154,284

[22] Filed: May 29, 1980

[30] Foreign Application Priority Data

Mar. 29, 1980 [DE] Fed. Rep. of Germany ....... 3012257
Mar. 29, 1980 [DE] Fed. Rep. of Germany ....... 3012327

[51] Int. Cl.³ ............................................. H04N 3/36
[52] U.S. Cl. ..................................... 358/214; 358/54
[58] Field of Search ............... 358/214, 215, 216, 132, 358/54

[56] References Cited

U.S. PATENT DOCUMENTS

| | | | |
|---|---|---|---|
| 4,149,191 | 4/1979 | Longchamp | 358/214 |
| 4,151,560 | 4/1979 | Zinchuk | 358/214 |
| 4,205,337 | 5/1980 | Millward | 358/214 |
| 4,288,818 | 9/1981 | Poetsch | 358/214 |
| 4,310,856 | 1/1982 | Poetsch | 358/214 |

Primary Examiner—Michael A. Masinick
Attorney, Agent, or Firm—Frishauf, Holtz, Goodman & Woodward

[57] ABSTRACT

To prevent cut edges with studio asynchronous film speeds below 50 frames per second, during the reading in of one film frame into one field store, the other field store is simultaneously completely and frequently read out until the reading in of the one film frame has finished. To prevent cut edges during the scanning of 35 mm Cinemascope films, the frame store is divided into six storage regions each 2 of which belong to one field store are driven alternately from film frame to film frame whereas the 3rd storage region of each field store is driven during each film frame.

4 Claims, 5 Drawing Figures

METHOD FOR THE TELEVISION SCANNING OF FILMS

BACKGROUND OF THE INVENTION

The present invention relates to apparatus for the television scanning of films.

Apparatus for scanning a film in a line-by-line manner to enable the film to be shown on television has already been proposed in German OS No. 27 35 685 to which U.S. Pat. No. 4,288,818, POETSCH, assigned to the assignee of this application, corresponds. An improved version of that apparatus is disclosed in German Patent Application P No. 2921934 which is the subject of United States Patent Application Ser. No. 061,151,781, filed May 21, 1980, now U.S. Pat. No. 4,310,856 to Dieter Poetsch, assigned to the assignee of this application.

Two disadvantages of the apparatus described in the above reference U.S. Pat. No. 4,310,856 have been discovered. The first is that during the so-called uncoupled operation of the film scanner, that is when the film is running asynchronously with respect to a television studio clock signal at a speed of less than 50 frames per second, the reproduced television picture has a horizontally extending cut edge. Due to this interfering cut edge, the television picture is divided into two regions wherein the lower portion still includes information from the preceding film frame.

The second disadvantage is that during the scanning of 35 mm Cinemascope films, in which the frame line of the film is known to be narrower than the V-blanking intervals of the television picture, the reproduced television picture has a horizontally extending cut edge. The television picture is divided into two regions by this interfering cut edge wherein the lower portion still contains information from the preceding film frame.

SUMMARY OF THE INVENTION

In one aspect, the present invention relates to a system for the scanning of films to obtain television signals wherein the film is scanned line by line without line interlacing, the signals each belonging to a scanned line are read into a frame store in the form of an address characterising the position of the particular line within a film frame and the content of the frame store is read out according to the television standard. In accordance with the invention, at studio asynchronous film speeds below 50 frames per second, during the reading in of one film frame into one of the two field stores of the frame store, the other field store is simultaneously completely and frequently read out until the reading in of one of the film frames into one of the field stores is completed and the next film frame is read into the other store so that the respective reading out of one field store only begins after the complete reading in of one field store and the complete reading out, possibly many times, of the other field store.

This has the advantage that at studio asynchronous speeds or with a film speed of 18 frames per second for the reproduction of super-8 films, the existence of cut edges in the reproduced television picture is more reliably avoided.

From another aspect, during the scanning of 35 mm Cinemascope films, the frame store (16) is divided into six storage regions (61', 61", 61''', 62', 62", 62''') each three of which form one of the two field storage regions (61 or 62), the respective three storage regions belonging to one half frame store consist of two equally large storage units (61'/62' or 61"/62") in which about ⅓ of the film frame to be scanned is stored and of a storage unit (61'''/62''') about twice as large in which the remainder of the film frame to be scanned is stored and the film store is so addressed that both during reading in and during reading out the particular smaller storage units (61'/62' or 61"/62") are alternately switched from film frame to film frame whereas the twice as large storage unit (61'''/62''') is used during each film frame.

This has the advantage that, during the scanning of 35 mm Cinemascope films, cut edges in the reproduced television picture are prevented. Moreover, this has the additional advantage that the beginning of the read out may be displaced within the studio synchronous V raster, for example for the incorporation of sub-titles without cut edges occurring in a displaced position.

BRIEF DESCRIPTION OF THE DRAWINGS

In order that the present invention be more readily understood, embodiments thereof will now be described by way of example only with reference to the accompanying drawings, in which.

DESCRIPTION OF THE PREFERRED EMBODIMENT

Figure 1:
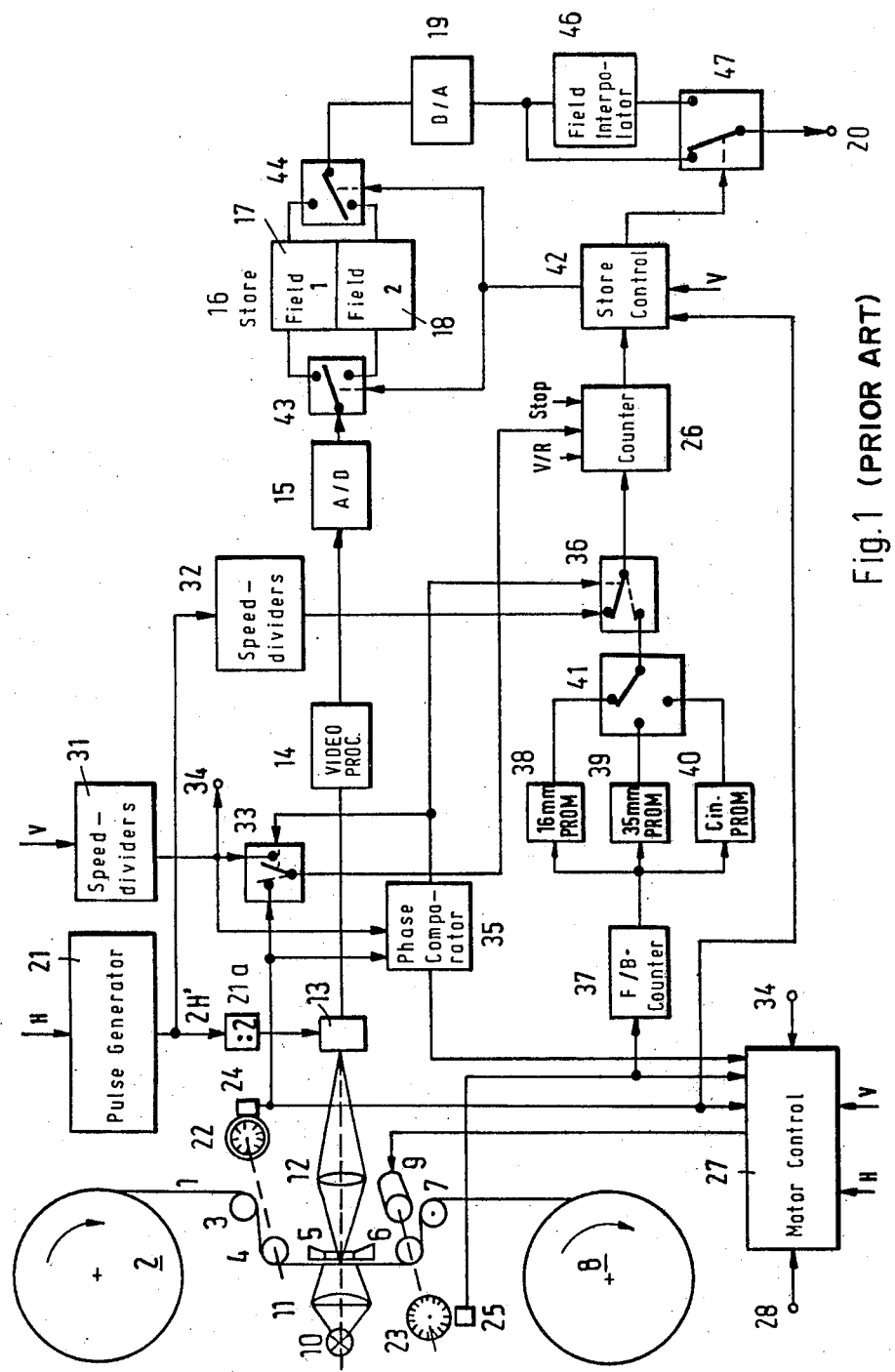
FIG. 1 shows a block diagram of the apparatus disclosed in U.S. Pat. No. 4,310,856 to Dieter Poetsch.

Referring now to FIG. 1, this shows the apparatus, the subject of the above-identified U.S. Application and is given to enable full understanding of the present invention.

A film 1 to be scanned is unwound from a storage spool 2 and is transported to a take-up spool 8 over a guide roller 3, a toothed roller 4, a film gate 5, a capstan roller 6 and a further guide roller 7. The film speed is determined by the capstan roller 6 which is driven by a capstan motor 9 whilst the devices (not shown in the figure) for driving the spools 2 and 8 are simply controlled so that the film moved by the capstan roller is correspondingly unwound and taken-up.

The film is illuminated by a lamp 10 which is provided with a condenser 11. The film is scanned in lines by projection onto the line forming opto-electric converter 13. For explaining the invention, only one opto-electric converter 13 is provided in the system according to the figure, however, the use of the invention is not dependent on whether it is a question of film scanning for coloured or black and white television. In the case of coloured television, there are preferably three converters in place of the single opto-electric converter, onto which the light is projected with the aid of a known colour separation device. A fuller disclosure of exactly how to scan the film and produce the line by line signals is given in German OS No. 27 35 685.

The output signals from the opto-electric converter 13 are amplified and if necessary are subjected to corrections known in television technology and which take place in a video processor 14. Then, the signals, which are analogue signals, are converted into digital signals using an analogue-digital-converter 15. As is well known, digital signals may be easily stored without loss of quality. For this purpose, the output from the analogue-digital-converter 15 is connected to a store 16 which consists of two field stores 17 and 18. The content of a complete television picture can be stored in the store, if necessary, including the colour information. The digital television signals are read out of the stores 17 and 18 in accordance with the television standard, are once again converted into analogue signals in a digital-analogue-converter 19 and are available at the output 20 of the system.

The line by line scanning of the film frames, that is to say the control of the opto-electric converter 13, takes place with the aid of a line frequency H' generated by a scanning pulse generator 21 (2H') and then halved in a divide-by-2 circuit 21a. The frequency of the pulse generator 21 is varied to a greater or lesser extent from the line frequency H of the television standard in accordance with the film format. Since, during the vertical fly-back periods, no information is transmitted by the television signal, the frame content is not divided into 625 lines but into about 590 lines (with the European television system). If the continuously moving film was to be scanned at the same line frequency then the same percentage of the film would not be transmitted either. Since, an intermediate space (frame separating line) is located between the individual film frames and which does not normally correspond to a portion of the vertical fly-back period, a variation in the line frequency during scanning is required according to the width of the said intermediate space. If, for example, when scanning according to the European television standard, the intermediate space is larger than 8% of the frame height, then a scanning at a somewhat higher frequency is necessary. However, since these differences are relatively slight both with 16 mm and 35 mm film, it is sufficient to vary the repetition frequency whilst the time, during which a line is scanned, can be maintained constant so that with an insignificant increase in the line repetition frequency only the horizontal period blanking interval becomes shorter but the so-called active line period remains the same. The pulses derived from the line frequency of the television standard are generated by a phase controlled oscillator operating at 2484 times the line frequency.

For the derivation of an address which corresponds to the position of the particular line within the film frame, pulses are derived on the one hand from the toothed roller 4 and which are associated with the upper and lower edge of each frame and pulses are derived from the capstan 6 which are brought into play for counting. For this purpose, an index plate 22 or 23 is associated respectively with the toothed roller 4 and the capstan 6. These index plates are provided with optical, mechanical or magnetic graduations which are sensed with the aid of a transducer 24, 25. Thus, for example, a pulse is generated in the transducer 24 as soon as the film has been advanced by one perforation division. These pulses are fed to the setting input to an address counter 26 through elements, the function of which will be described later.

A motor control circuit 27 serves for controlling the capstan motor 9, to which are supplied on the one hand the frame dividing line pulses and line counting pulses delivered by the converters 24 and 25 and on the other hand synchronising signals H and V from the television system. With the aid of the motor control circuit 27, the capstan motor 9 is so controlled that during reproduction at normal speed, the film is transported synchronously with the television synchronising signals. These circuits are sufficiently well known both in accordance with film scanners and with video magnetic recording apparatus and need not be described in further detail in this connection. For the slow motion and time-lapse reproduction of the film, it is possible for the capstan motor to run at another speed for which purpose a control voltage can be supplied to the motor control circuit 27 through an input 28.

So that the film is transported synchronously with the television synchronising signals, not only at normal speed but also at other speeds, two (coupled) speed dividers 31, 32 are provided. With the aid of these dividers, it is possible to so couple film speeds to the half frame frequency that the ratio of the half frame frequency to the number of scanned film frames per second, is a whole number multiple thus, for example, at 50 F/s=1, at 25 F/s=2, at $16\frac{2}{3}$ F/s=3, at $12\frac{1}{2}$ F/s=4, at $6\frac{1}{4}$ F/s=8. Moreover, frame synchronising pulses V are applied to the divider 31 and H' pulses (2H') are applied to the divider 32. The output from the divider 31 is connected to a switch 33, and also via a terminal 34 to the motor control circuit 27. The output from the divider 31 is also connected to an input to a phase comparator circuit 35, the other input of which is connected to the transducer 24. The output from the circuit 35 is fed to the motor control circuit 27 and the switch 33 to a switch 36. The output from the divider 32 to the switches 33 and 36 is used to control the position of the switch.

The output from the transducer 25 is connected through a forwards-backwards counter 37 to each of three fixed value stores 38, 39 and 40 in the form of programmable read only memories (PROM), which read out the pulses delivered by the transducer 25 in a manner depending on the film format used—16 mm, 35 mm, 35 mm Cinemascope. The particular store associated with the appropriate film format can be connected to the switch 36 through a selector switch 41. The output from the switch 36 is connected to the input to the address counter 26, the output from which is connected to a store control 42. The store control 42 controls the switches 43, 44 associated with the store 16 as well as the switch 47 associated with a field interpolator 46. When switching on the television film scanner for normal operation, that is to say with a film speed of 25 F/s in the forwards direction, the film is first of all transported during a starting up phase in the so-called "uncoupled type of operation". In so doing, the switch 41 is connected to one of the fixed value stores 38, 39 or 40 in accordance with the appropriate film format. The switch 36 is in the lower dotted position so that the address counter 26 receives address pulses derived from the index plate 23 of the capstan 6. Moreover, the switch 33 is likewise in the dotted position so that the setting input to the address counter 26 is controlled by the pulses from the toothed roller index plate 22. The fixed value stores preferably have the following divisors: store 38 a factor of 2484; store 39 a factor of 2146; and store 40 a factor of 3450.

The store control 42 switches over the switches 43 and 44 simultaneously. It leaves the switch 43 in one position long enough for the video signals to be transferred to one of the field stores 17 or 18 until it is filled up. Moreover, the read out switch 44 connects the other field store 18 or 17 to the output 20 for the same length of time whereby the missing interlaced line of the missing field is generated with the aid of the field interpolator 46 by the averaging of two adjacent lines. In so doing, the switch 47 is switched by the store control 42 at frequency V.

The motor control circuit 27 then increases the motor speed of the capstan motor 9 until the latter has reached the nominal speed—through the film drive, for example the toothed roller 4, index plate 22, transducer 24 after phase comparison with the studio clock in the circuit 35. When the film speed agrees with the V frequency delivered by the studio pulse generator, the film scanner switches into the so-called "coupled type of operation", that is to say the film is then transported synchronously with the studio television clock. In so doing, the switches 33 and 36 are brought into the illustrated position so that the address counter 26 is connected to the coupled speed dividers 31 and 32.

The switch 43 is then switched every alternate line and the switch 44 every alternate field (full frame read in) wherein a predetermined phase difference must be maintained between the film scanning and the reading out of the television signals from the store 16 so as to be able to associate each television picture with a scanned film frame. However, since with television a field is transmitted and then a second field interlaced line by line therewith, whereas when scanning with the system in accordance with the invention the film itself is scanned line by line, this phase difference must be selected large enough for the last line of each film frame to be read into each field store 17, 18 before the last line of the first field needs to be read out from the store 17. On the basis of these considerations, a phase difference of about one field results. Moreover, the switch 47 is likewise in the illustrated position so that the switch 44 is connected directly to the output 20 through the D/A converter 19.

With the "coupled type of operation" it is also possible, as already described, to transport the film synchronously with the studio clock at other film speeds which are at a particular relationship with respect to the half frame frequency. For this purpose, the dividers 31 and 32 are switched in automatically by selector keys corresponding to the selected film speed, for example, 16⅔ or 16½ F/s. The switches 33 and 36 are in the illustrated position. The switch 43 is then no longer always switched over in the V intervals at line frequency but at frame frequency according to the choice of film speed so that a respective film frame is read into a field store 17 of 18. Since, the switch 44 controlled at field frequency is always switched over in the V interval, a cutting edge between two film frames is no longer visible.

The same method of operation of the film scanner applies to a film speed of 25 F/s for the reverse run wherein only the forwards/backwards (V/R) input to the address counter 26 needs to be set correspondingly.

With the "uncoupled type of operation" and a film speed of below 50 F/s, the film scanner is operated as in the starting up phase for normal speed and at a speed of more than 50 F/s, only the switch 44 is switched over at V frequency whilst the swtich 43 is switched over per film frame and the switch 47 remains in the illustrated position.

The apparatus has been designed for a normal operation speed of 25 F/s.

For the production of a still frame from the film drive, the address counter 26 is blocked by a "stop" signal after a complete film frame has been read into the store 16 and the field stores 17 and 18 are read out alternately during a stop from the normal speed at field frequency whilst at the stop the field store filled with the last film frame is read out at all other speeds wherein the missing interlaced lines from the missing field are generated by the field interpolator 46.

For the production of a still frame, the film speed is reduced until the film is stationary and is positioned in the frame gate at the position of the last stored film frame.

It is apparent from the above description that the same toothed roller 4 is used to generate pulses from the transducer 24 irrespective of the film format being scanned (e.g. 16 mm; 35 mm; 35 mm Cinemascope) and that the fixed value stores 38, 39, 40 produce a division of the line pulses from the transducer 25 depending on the format being scanned. Further, the outputs from the fixed value stores are used to generate the required odd numbered division ratios.

Figure 2:
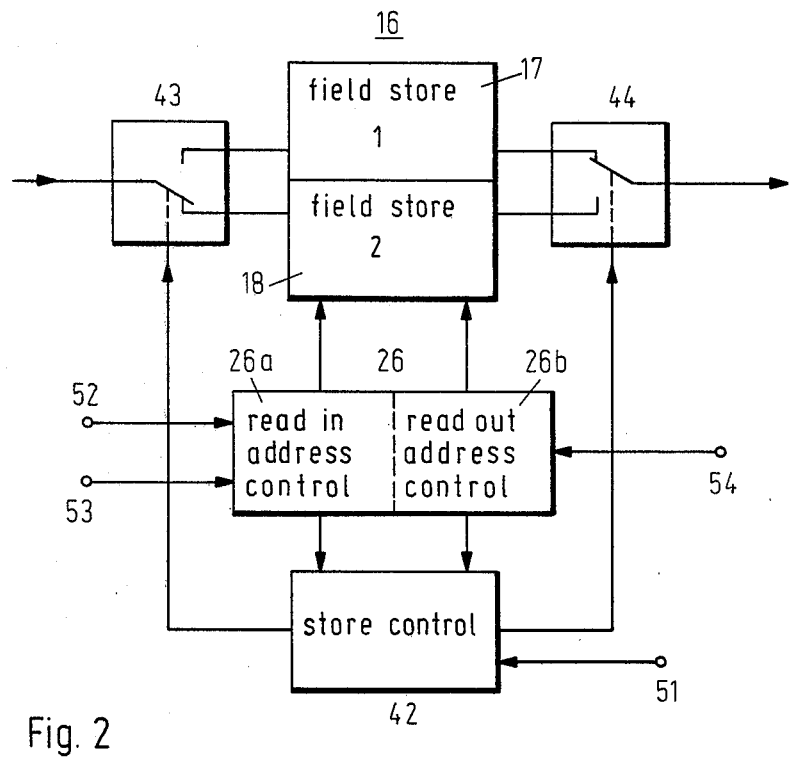
FIG. 2 shows a block diagram of a modification of the picture storage control portion of the circuit shown in FIG. 1.

The portion of the television film scanning system illustrated in FIG. 1 which concerns the reading in and reading out control for the field stores 17 and 18 can be modified as shown in FIG. 2 where, for the sake of simplicity, the same references have been used as in FIG. 1 for the same parts.

The video signals converted into digital signals are transmitted to the store 16 by the switch 43 and during reading out of the store 16 they are conducted to the digital-analogue-converter by the switch 44. The switches 43 and 44 are switched over by the store control 42 which is controlled by signals from the address counter 26 and from the studio coupled V-blanking signal through the terminal 51. In this case, the address counter 26 consists of a read in address control 26a to which are transmitted the frame division pulses derived from the toothed roller of the film projector (terminal 52) and the film-dependent line frequency signal derived from the capstan (terminal 53), and the read out address control 26b to which are transmitted the studio synchronous signal at vertical frequency and the studio synchronous signal at horizontal frequency (terminal 54). Thus, the portions 26a and 26b of the address counter 26 simultaneously control the read in as well as the read out of the field stores 17 and 18.

The reading in of a film frame into the store 16 takes place as with the system according to FIG. 1, that is to say a respective film frame is completely read into one of the field stores 17 or 18. Thus, the switching over of the switch 43 takes place in accordance with the frame separating line pulses which are transmitted to the read in address control 26a through the terminal 52.

The reading out of the field stores 17 and 18 takes place in accordance with the invention so that the respective other field store into which nothing is being read in is completely frequently read out until the reading in operation into one of the field stores has finished.

Figure 3:
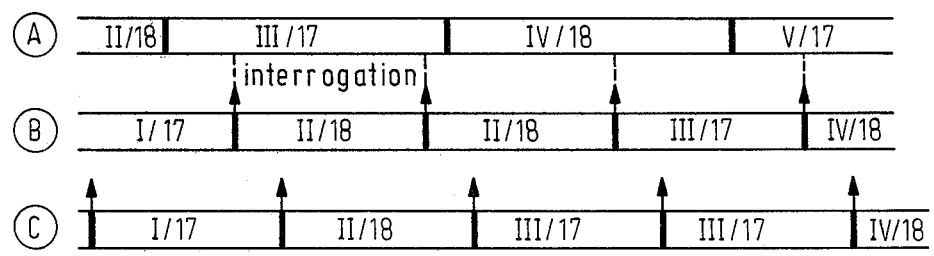
FIG. 3 is a storage time diagram for assisting understanding of FIG. 2.

This type of operation in accordance with the invention of reading in and reading out the field stores will now be described in more detail with the aid of FIG. 3. The reading in operation of four successive film frames II-V in alternate sequence into the field stores 17 and 18 is illustrated in line A. In this instance, the film frame II is read into the field store 18, for example, and the film frame III is read into the field store 17 etc.

Two different reading out positions are illustrated in lines B and C. Thus, in the position illustrated in line B the film frame I is still being read out of the field store 17. After the complete read out of the field store 17, an interrogation takes place (each illustrated by a vertical arrow) through the store control 42 in which the two field stores are read in at the time. After reading into the field store 17 has been established, switching over of the switch 44 from the field store 17 to the field store 18 takes place. After the complete read out of the field store 18 an interrogation takes place once again and since reading in then occurs in the field store 17, the field store 18 is completely read out once again. Only on the occurrence of the next interrogation is it established that reading into the field store 18 is then accomplished. Then, the switch 44 is switched over and the film frame III is read out of the field store 17. After complete reading out of the field store 17, an interrogation takes place once again. Since reading into the said field store has already taken place the switch 44 is switched over to the field store 18 and the film frame IV is read out from this store. The same applies to the reading out position illustrated in line C.

In so doing, it can never happen that the particular field store is switched over during the reading out of a film frame. Thus, a cut edge in the reproduced television picture which separates the content of two film frames in the television picture is reliably avoided.

The fields read out of the field stores 17 and 18 are then alternately supplied directly and through a field interpolator to the video output as described in relation to FIG. 1.

Figure 4:
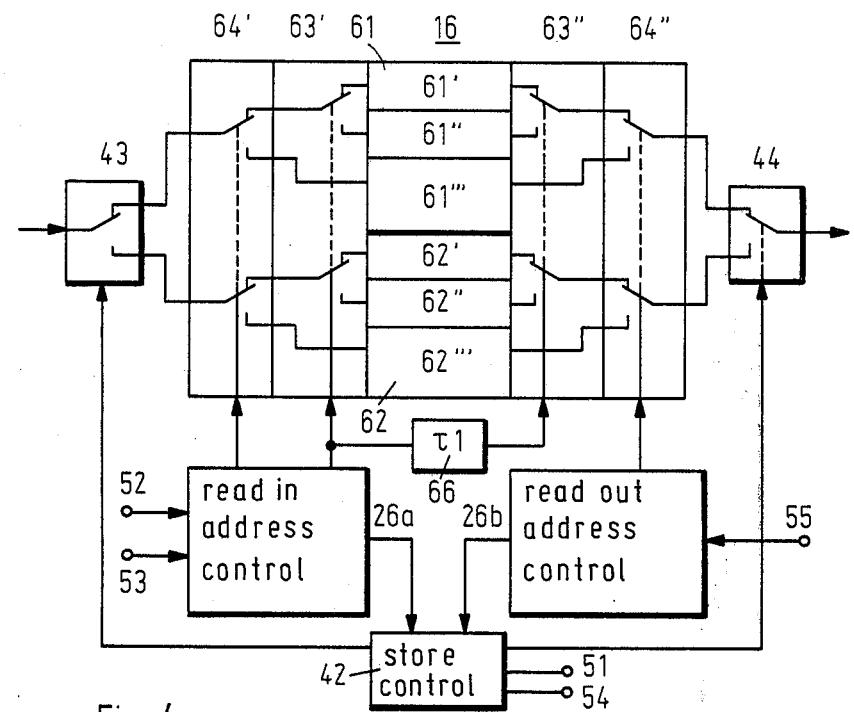
FIG. 4 shows a block diagram of another modification of the picture storage control portion of the circuit.

Turning now to FIG. 4, this shows another modification which can be made to the reading in and reading out control of the frame store 16 in FIG. 1 and again the same references are used as in FIG. 1 for the same parts.

The video signals of the film scanner converted into digital signals are transmitted to the frame store 16 and are fed to the digital-analogue-converter during reading out of the frame store 16. The switches 43 and 44 are switched over by the store control 42 which is controlled by signals from the address counter 26 and from a studio coupled V blanking signal through terminal 51 as well as by the 2 V pulse signal through terminal 54. In this instance, the address counter 26 consists of a read in address control 26a to which are fed the vertical pulses derived from the toothed roller (terminal 52) and the film dependent horizontal pulses (terminal 53) derived from the capstan, and the read out address control 26b to which are fed the studio synchronous signals at vertical and horizontal frequency (terminal 55). Thus, the parts 26a and 26b of the address counter 26 simultaneously control the reading in as well as the reading out of the store 16 subdivided into storage units.

For this purpose, the frame store 16 is divided into six storage regions 61', 61", 61''', 62', 62", 62''' of which the regions 61 characterise one field storage region and the regions 62 characterise the other field storage region. Thus, the frame store 16 consists of three storage units 61'/62' and 61"/62" and 61'''/62''' the storage capacity of which is divided in the following manner: 128 lines can be stored in each of the two units 61'/62' and 61"/62" and 286 lines can be stored in the unit 61'''/62''', that is to say the units 61'/62' and 61"/62" can each store about 31% of a film frame whereas the unit 61'''/62''' can store about 69% of a film frame.

Since, with 35 mm Cinemascope film, only a total of 414 lines need be stored for each film frame because of the aspect ratio of 1.85:1 of the display (as opposed to 575 lines for 35 mm normal film; aspect ratio 1.3:1), a buffer store is also available. Thus, the storage units 61'/62' or 61"/62" are alternately driven from film frame to film frame whereas the storage unit 61'''/62''' is used for every film frame.

For this method of operation of the frame store 16, the switches 63' and 63" are each switched over from film frame to film frame wherein the switches 63" are each switched by the delay circuit 66 delayed by one half frame. The switches 64' and 64" are each switched over at the end of the reading in or reading out of a storage unit, for example from 61'/62' to 61'''/62'''. The switches 43 and 44 are switched over at alternate lines or in a field manner as described in the main application.

Figure 5:
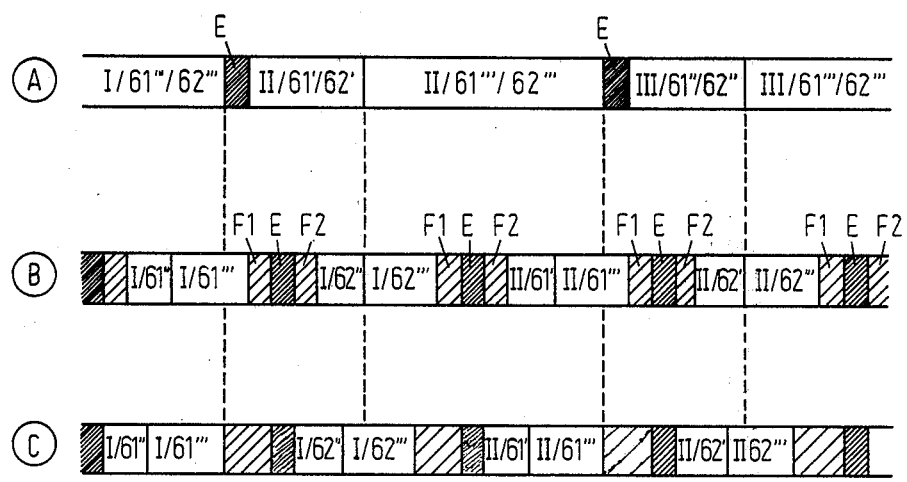
FIG. 5 is a storage time diagram for assisting understanding of FIG. 4.

The method of operation in accordance with the invention of the reading in and reading out of the frame store 16 with 35 mm Cinemascope films will now be explained in detail with the aid of FIG. 5.

The reading in operation of three successive film frames I-III into the storage units or portions 61'''/62''' or 61'/62' and 61'''/62''' or 61"/62" and 61'''/62''' is illustrated in line A.

Two different reading out positions are illustrated in lines B and C and indeed in line B a central position in the reproduced television picture and in line C a position in the reproduced television picture displaced upwards to some extent so, for example, as to include text in the lower black margin.

During the read in at alternate lines of a portion of the film frame I in the storage unit 61'''/62''', the field store region 61", containing the first portion of frame I, is simultaneously read out. The remainder of frame I is then read out of the region 61'''''. The first complete field of the film frame I can be taken from the output from the frame store 16 according to the television standard. After a blanking interval E, the film frame II is read in at alternate lines into the storage unit 61'/62' and then read into the storage unit 61'''/62'''. During this period the field store region 62" and then the region 62''' is read out after the Cinemascope blanking interval F 1, which corresponds to the lower black margin in the television picture, and after the television blanking interval E and the Cinemascope blanking interval F 2 which corresponds to the upper black margin of the television picture, so that the second complete field of the film frame I can be taken from the output from the frame store 16.

The reading in and reading out of the subsequent film frames takes place accordingly so that the reading in and the reading out of the individual storage regions can never overlap.

The fields read out from the field storage regions 61 and 62 are then further processed as described in relation to FIG. 1.

What is claimed is:

1. A method for the scanning of films and to derive television signals therefrom with line interlace,
 wherein the film is scanned line by line without line interlacing, the signals each belonging to a scanned line are read into a frame store (16) having two field stores (17,18) at an address characterizing the position of the particular line within a film frame, and the content of the frame store is read-out according to a television standard,
 comprising, for studio asynchronous film speeds below 50 frames per second, the steps of reading-in one film frame into one (17) of the two field stores (17,18) of the frame store (16), and simultaneously completely, and repetitively reading-out the other field store (18) until the reading-in of one of the film frames into said one (17) of the field stores (17,18) is completed;

reading-in the next film frame into the other store (18) so that the respective reading-out of one field store (e.g. 17) only begins after the complete reading-in into a field store (then 17) and the complete reading-out, at least once, of the other field store (18).

2. Method according to claim 1, including the step of interrogating the other field store (then 18) upon completion of read-out of one field store (e.g. 17), and determining if the entire field store is full with data read-into therein, and (a) if YES: switching to read-out of the other field tore (18), (b) if NO: repeating read-out of said one field store (17).

3. A method for the scanning of films and to derive television signals therefrom with line interlace, wherein the film is scanned line by line without line interlacing, the signals which belong to a respective scanned line are read into a frame store (16) at an address characterizing the position of the particular line within a film frame and the content of the frame store is read out in accordance with a television standard, wherein the particular address is formed by counting pulses derived from the line frequency and the frame frequency of the television standard, comprising, for the scanning of 35 mm Cinemascope films, the steps of dividing the frame store (16) into six storage regions (61', 61", 61''', 62', 62", 62'''), two groups of which form one of the two field storage regions (61 or 62), wherein the respective three storage regions belonging to one field store comprise two smaller storage units (61'/62', 61"/62") of equal capacity in which about ⅓ of the film frame to be scanned is stored and a storage unit (61'''/62''') about twice as large in which the remainder of the film frame to be scanned is stored;

and so addressing the film store that both during reading-in and during reading-out the particular smaller storage units (61'/62'; 61"/62") are alternately switched from film frame to film frame and the twice-as-large storage unit (61'''/62''') is used during each film frame.

4. A method according to claim 3, including the step of switching the appropriate storage units associated with the respective two field stores are at alternate lines during reading-in, and switching other storage units for simultaneously read-out to provide, successively, complete fields.

* * * * *